May 7, 1935. J. F. QUEREAU Re. 19,564

THERMOPILE

Original Filed April 1, 1931

Inventor
John F. Quereau
By Lorenzo S. Chaet
his Attorney.

Reissued May 7, 1935

Re. 19,564

UNITED STATES PATENT OFFICE 19,564

THERMOPILE

John F. Quereau, Barren Hill, Pa., assignor to Leeds & Northrup Company, Philadelphia, Pa., a corporation of Pennsylvania Original No. 1,988,858, dated January 22, 1935, Serial No. 527,035, April 1, 1931. Application for reissue March 9, 1935, Serial No. 10,328

11 Claims. (Cl. 136—4)

My invention relates to electrical measuring apparatus involving a thermopile for measuring the magnitude, or changes in magnitude, of any condition affecting the radiant heat input thereto, for example, the temperature of a radiant body, or a property, as density, of a mass interposed between the thermopile and said body.

Prior to my invention, for a given heat input, the electromotive force or voltage produced by a multiple-junction thermopile varied for different ambient temperatures, for example decreasing with increase of ambient temperature though the radiant heat received by the hot junctions of the thermopile remained constant. Consequently readings of the thermopile voltage could not be relied upon as a measurement of heat input since changes in the voltage were sometimes due solely to change in ambient temperature, and sometimes due to concurrent changes in both heat input and ambient temperature, with the further complication that the concurrent changes of heat input and ambient temperature were sometimes additive in their effect upon the thermopile voltage and at other times subtractive.

The thermopile voltage was not only affected by ambient temperature but also by sudden changes from one ambient temperature to another, further contributing to the unreliability of the voltage readings.

In accordance with my invention, the thermopile voltage is made to be substantially independent of ambient temperature, at least throughout a wide range of variation, by so constructing the thermopile that the losses by radiation from the hot junctions is so proportioned with respect to the other losses of heat therefrom that the effect of change of ambient temperature upon the temperature difference between the the hot and cold junctions is balanced by the effect of change of ambient temperature upon the potential difference between the junctions; specifically, the tendency of the temperature difference to decrease with an increase of ambient temperature because of radiation from the hot junction is compensated for by the rising voltage-temperature characteristic of the thermopile, so that for any given input, the voltage output of the thermopile is substantially the same regardless of variations of ambient temperature.

Further in accordance with my invention, the heat capacities of the hot and cold junctions including masses thermally related thereto are substantially equal to ensure substantially simultaneous arrival of the hot and cold junctions at temperature equilibrium irrespective of the rate of change of ambient temperature, and further, provision is made to ensure uniform temperature of the casing immediately surrounding the thermopile, though the temperature of the casing as a whole may be changing.

For an understanding of my invention and for illustration of a preferred form of a thermopile construction utilizing it, reference may be had to the accompanying drawing in which.

Figure 3:
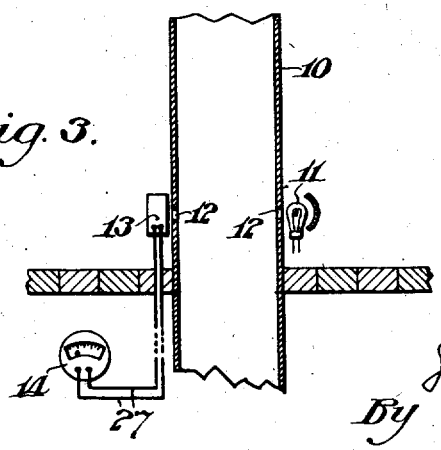
Fig. 3 is a diagrammatic showing of an application of my invention to the indication of smoke density.

While my invention is of general application in radiation pyrometry for indicating variations in radiant energy impinging on its sensitive surface, I have shown in Fig. 3 its application to indicate the density of a column of a medium or fluid, specifically smoke. A stack 10 for conducting smoke from a furnace or burner is provided with apertures 12—12, opposite one of which is mounted a suitable source of radiant energy 11, for example a light source. Opposite the other aperture is mounted a thermopile 13 constructed so as to incorporate the feature of my invention. An indicating or recording instrument 14, such as a galvanometer or millivoltmeter, is conveniently located within the plant or boiler room. As the density of the column of smoke varies the electromotive force produced at the terminals of the thermopile varies inversely to the density of the medium to be observed, if the light source is kept at constant intensity. These variations in E. M. F. may be received by instrument 14 and be indicated or measured by it. In applications of thermopiles such as this, the thermopile instrument may be subjected to a wide range of ambient temperatures and to more or less rapid variations in ambient temperature by reason of the exposed location of the thermopile instrument. Unless these ambient temperature changes are compensated for or their effects nullified, the indications of the associated indicating instrument or meter are not reliable as an index of the condition of the medium under observation.

Figure 1:
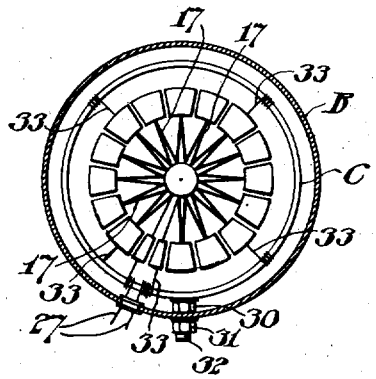
Fig. 1 is a sectional view of a thermopile taken on line 1—1 of Fig. 2.
Figure 2:
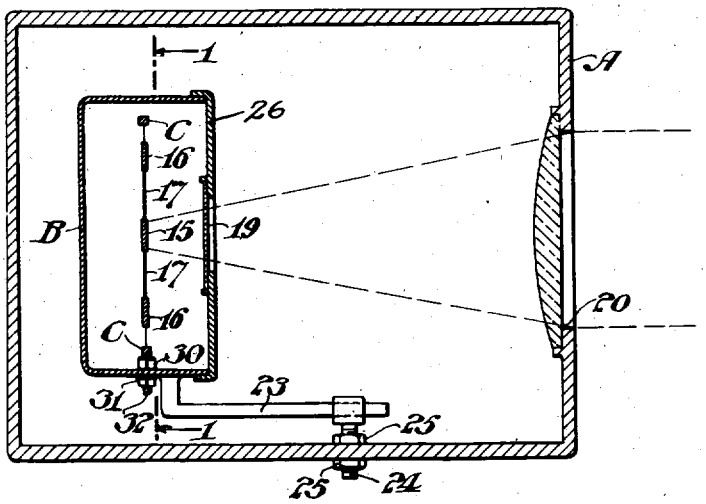
Fig. 2 is an elevation in medial section showing the encased thermopile of Fig. 1 within a housing.

The multiple thermopile shown in Figs. 1 and 2 is of my improved type arranged to compensate for and nullify the effect of changes in ambient temperature. Casing A is an air tight heat insulating housing for the thermopile which is provided with an aperture sealed and covered by a glass lens, window, or roundel 20. Adjustably supported within the casing A by means of bracket 23 which is held to case A by bolt 24 and nuts 25, is an inner case or shield B of metal of good heat conducting properties, for example, copper, and preferably also, of substantial thickness.

The thermopile proper comprises a plurality of thermo-electric elements shown as thermo-couples 17—17 of any suitable thermo-electric combination of metals, as for example, iron and constantan. These thermo-couples are series connected to form a thermopile. The inner ends of these thermo-couples comprise the hot junctions of the thermopile and are connected to a target 15 for receiving radiations from a source of radiant energy. The hot junctions are electrically but not thermally insulated from each other in their connections to the target.

The outer or cold ends of the thermo-couples are each connected to a heat radiating fin or plate 16 having a large surface area. The entire structure of the thermopile proper described above comprising the thermo-couples 17—17, target 15 and radiating fins 16 is suspended from a ring C made of heat conducting material in shield or case B by means of filaments or small insulated wires 33. Supporting ring C is spaced from the interior wall of casing B by washer or nut 30 and suitably clamped to casing B as by nut 31 which threadably engages stud 32 extending from ring C, through spacer 30 exteriorly of the casing.

Connection is made from measuring device 14, or equivalent, to the thermopile by external leads or terminals 27. Shield or case B is provided with a cover 26 having an aperture sealed and covered by a glass window or roundel 19. Windows 19 and 20 are in alignment with target 15 so that radiant energy will be permitted to impinge on 15 while fins 16 are shielded from direct radiation from the source of energy.

In a thermopile, heat is dissipated or lost from the hot junctions by radiation, conduction and convection. The loss by conduction for any given temperature difference is substantially independent of ambient temperature. The loss by convection is practically independent of ambient temperature, or in any event the loss is slight and the expedients resorted to in accordance with my invention for compensating for the loss by radiation are also effective to minimize any effects of ambient temperature upon the convection loss.

Radiation of heat from the hot junctions varies in accordance with the fourth power law, increases as the ambient temperature increases, and results in decrease of the temperature difference between the hot and cold junctions for any given heat input. It may be shown mathematically and it has been proven by tests that if there is any radiation from the hot junctions or conductors therefrom that with increase of ambient temperature there is a decrease in temperature difference between the hot and cold junctions, and consequently a tendency for the electro-motive force produced by the thermopile to decrease with increase of ambient temperature, and vice versa.

The temperature-voltage characteristic of the thermopile varies in the proper sense to oppose this tendency; that is, the electro-motive force generated per degree difference between the hot and cold junctions increases as the ambient temperature increases. In the multiple junction thermopiles previously known, the decrease in voltage due to decrease in temperature difference, resulting from increased radiation from the hot junctions at increased ambient temperature is materially greater than the increase in voltage generated per degree difference for increase in ambient temperature. Consequently, the voltage output of the thermopile was an unreliable index of the heat received from the radiant source; for example, the voltage might decrease indicating an apparent decrease of heat input whereas in fact, the decrease might be wholly or principally due to rise in ambient temperature with little or no change in heat input. On the other hand, the heat input might decrease, yet if there was concurrently a decrease in ambient temperature, the voltage might remain the same, or even increase instead of decreasing.

In the construction herein shown, the radiation from the hot junctions and leads is reduced somewhat by making the areas of the radiating surfaces as small as possible, by brightening the leads and rear surface of target 15, etc. The principal reduction in radiation is however, effected by lowering the temperature of these elements relative to their surroundings, or more generally reducing the temperature difference between these heat radiating bodies and surfaces receiving radiant heat therefrom. This is accomplished by lowering the thermal resistance of the leads, that is the electrical conductors between the hot and cold junctions, so that heat is rapidly removed by conduction from the hot junctions and target. The heat so transferred to the cold junctions is removed both by radiation and convection from the large surfaces afforded by fins 16, or equivalent, which are at a temperature only slightly higher than the temperature of the walls of housing B and the atmosphere therein.

Compensation for ambient temperature may be attained by associating with or attaching to the cold junctions, any body or mass suitable for heat dissipation; for example, the ring C or case B, instead of fins 16. With this construction however, the thermopile is subject to serious error for sudden or rapid changes of ambient temperature.

In the preferred construction illustrated, except for the few small wires 33, there is no contact between the entire thermopile assembly, target, fins, junctions and conductors, and case B or any other body. The heat capacities of the hot junction target 15 and cold junction fins 16 are approximately equal, and further the masses of both are small. As there is no large mass incorporated in or in contact with any component of the thermopile, the thermopile upon change in ambient temperature quickly attains equilibrium as a unit, with no one portion lagging behind the remainder.

The housing A, of any suitable material having low heat conductivity, prevents any sudden change in temperature of the atmosphere exteriorly of the housing from effecting a correspondingly rapid change of temperature of the housing interior. If the housing is heated or cooled on one side only, radiation between the walls and convection currents within the housing tend to produce non-uniform temperature of the surroundings of the thermopile. Casing B, however, protects the thermopile from convection currents within housing A, and being a good conductor of heat ensures uniform temperature within casing B, that is, of the atmosphere immediately surrounding the thermopile. If any portion of the casing is heated more than another, the heat is rapidly conducted to all parts of the casing equalizing the temperature difference.

While the above description relates to specific embodiments of the invention it is to be understood that various modifications may be made without departing from the scope of the invention as defined in the appended claims.

What I claim is:

1. A thermopile for radiation pyrometry whose components comprise a plurality of pairs of hot and cold thermo-junctions, and means for thermally and electrically connecting said hot and cold junctions, said components being so constructed and arranged that the loss of heat by radiation from the hot junctions is so proportioned with respect to the other losses of heat therefrom that for any given radiant heat input to the hot junctions the resulting temperature difference between the hot and cold junctions at different ambient temperatures is such that the output voltage of the thermopile is substantially constant at said given radiant heat input at said different ambient temperatures.

2. A thermopile for radiation pyrometry whose components comprise a plurality of pairs of hot and cold thermo-junctions, and means for thermally and electrically connecting said hot and cold junctions, said components being so constructed and arranged that the loss of heat by radiation from the hot junctions is so proportioned with respect to the other losses of heat therefrom that the relations of change in ambient temperature with respect to corresponding losses of heat from the hot junctions is complementary to the voltage-temperature characteristic of the thermo-junctions to obtain, for different ambient temperatures, a substantially fixed output voltage for any given radiant heat input to the thermopile.

3. A thermopile for radiation pyrometry whose components comprise a plurality of pairs of hot and cold thermo-junctions, and means for thermally and electrically connecting said hot and cold junctions, said components being so constructed and arranged that the tendency for the voltage generated, per degree of temperature difference between the hot and cold junctions, to change with change of ambient temperature for any given radiant heat input to the thermopile offsets the tendency for the temperature difference between the hot and cold junctions concurrently to change in reverse sense with change of ambient temperature for said given radiant heat input.

4. A thermopile for radiation pyrometry whose components comprise a plurality of pairs of hot and cold thermo-junctions, and means for thermally and electrically connecting said hot and cold junctions, said components being so constructed and arranged that the tendency for the output voltage to change, for any given temperature difference between the hot and cold junctions, at different ambient temperatures, compensates for the tendency for the temperature difference between the junctions to change, for any given radiant heat input, at different ambient temperatures.

5. A thermopile for radiation pyrometry whose components comprise a plurality of pairs of hot and cold thermo-junctions, and means for thermally and electrically connecting said hot and cold junctions, said components being so constructed and arranged that the loss of heat by radiation from the hot junctions is so proportioned with respect to the other losses of heat therefrom that the tendency for the voltage generated, per degree of temperature difference between the hot and cold junctions, to increase with increase of ambient temperature for any given radiant heat input to the thermopile substantially compensates for the tendency for the temperature difference between the hot and cold junctions to decrease with increase in ambient temperature for said given radiant heat input to the thermopile.

6. A thermopile for radiation pyrometry whose components comprise a plurality of pairs of hot and cold thermo-junctions, and means for thermally and electrically connecting said hot and cold junctions, said components being so constructed and arranged that the loss of heat by radiation from the hot junctions is so proportioned with respect to the other losses of heat therefrom that the tendency for the voltage generated, per degree of temperature difference between the hot and cold junctions to increase with increase of ambient temperature for any given radiant heat input to the thermopile substantially compensates for the tendency for the temperature difference between the hot and cold junctions to decrease with increase in ambient temperature for said given radiant heat input to the thermopile, and having the cold junctions and masses thermally associated therewith of low heat capacity substantially equal to the heat capacity of the hot junctions and masses thermally associated therewith, substantially to eliminate the effect of rapid changes of ambient temperature upon the temperature difference between the junctions.

7. A thermopile for radiation pyrometry whose components comprise a plurality of pairs of hot and cold thermo-junctions, and leads for thermally and electrically connecting said hot and cold junctions, said leads being of low thermal resistance to increase the conduction loss of heat from the hot junctions to effect such proportioning of the loss of heat by radiation from the hot junctions to the other heat losses therefrom that the tendency for the voltage generated, per degree of temperature difference between the hot and cold junctions, to increase with increase of ambient temperature for any given heat input to the thermopile substantially compensates for the tendency for the temperature difference between the hot and cold junctions to decrease with increase in ambient temperature for said given radiant heat input to the thermopile.

8. A thermopile for radiation pyrometry whose components comprise a plurality of pairs of hot and cold thermo-junctions, and leads for thermally and electrically connecting said hot and cold junctions, said leads having brightened surfaces to reduce radiation of heat therefrom and of low thermal resistance to increase the conduction loss of heat from the hot junctions to effect such proportioning of the loss of heat by radiation from the hot junctions to the other heat losses therefrom that the tendency for the voltage generated, per degree of temperature difference between the hot and cold junctions, to increase with increase of ambient temperature for any given radiant heat input to the thermopile substantially compensates for the tendency for the temperature difference between the hot and cold junctions to decrease with increase in ambient temperature for said given radiant heat input to the thermopile.

9. A thermopile for radiation pyrometry whose components comprise a plurality of pairs of hot and cold thermo-junctions, leads for thermally and electrically connecting said hot and cold junctions, said leads being of low thermal resistance to increase the conduction loss of heat from the hot junctions, and structure thermally associated with the cold junctions for dissipating the heat conducted thereto by said leads from the hot junctions to effect such proportioning of the loss of heat by radiation from the hot junctions to the other heat losses therefrom that the tendency for the voltage generated, per degree of temperature difference between the hot and cold junctions, to increase with increase of ambient temperature for any given radiant heat input to the thermopile substantially compensates for the tendency for the temperature difference between the hot and cold junctions to decrease with increase in ambient temperature for said given radiant heat input to the thermopile.

10. A thermopile for radiation pyrometry whose components comprise a plurality of pairs of hot and cold thermo-junctions, target structure upon which the radiant heat impinges, thermally conductively associated with said hot junctions and which, to reduce loss of heat by radiation, is of small area with brightened rear surface, and leads for thermally and electrically connecting said hot and cold junctions, the loss of heat by radiation from the hot junctions to the other losses of heat therefrom being so proportioned that the tendency for the voltage generated, per degree of temperature difference between the hot and cold junctions, to increase with increase of ambient temperature for any given radiant heat input to the thermopile substantially compensates for the tendency for the temperature difference between the hot and cold junctions to decrease with increase in ambient temperature for any given radiant heat input to the thermopile.

11. A thermopile for radiation pyrometry whose components comprise a plurality of pairs of hot and cold thermo-junctions, a target, for receiving applied radiant heat, thermally conductively associated with said hot junctions and which, to reduce loss of heat by radiation, is of small area with brightened rear surface, leads for thermally and electrically connecting said hot and cold junctions brightened to reduce radiation of heat therefrom and of low thermal resistance to increase the conduction loss of heat from the hot junctions, and structure thermally associated with the cold junctions for dissipating the heat conducted thereto by the leads, to effect such proportioning of the loss of heat by radiation from the hot junctions to the other heat losses therefrom that the tendency for the voltage generated, per degree of temperature difference between the hot and cold junctions, to increase with increase of ambient temperature for any given radiant heat input to the thermopile substantially compensates for the tendency for the temperature difference between the hot and cold junctions to decrease with increase in ambient temperature for said given radiant heat input to the thermopile.

JOHN F. QUEREAU.